Oct. 28, 1952     A. M. GRAY     2,615,318
SUPPORT FOR EATING UTENSILS
Filed June 7, 1949
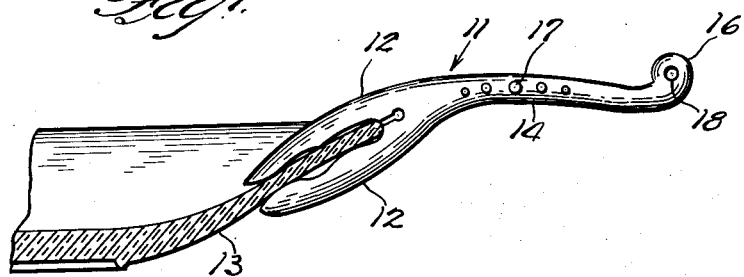
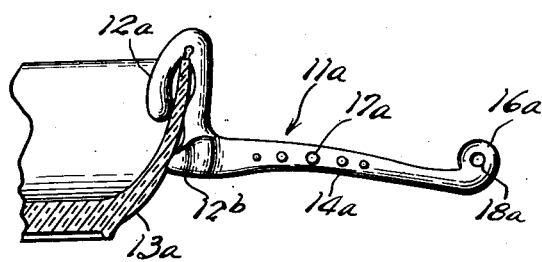
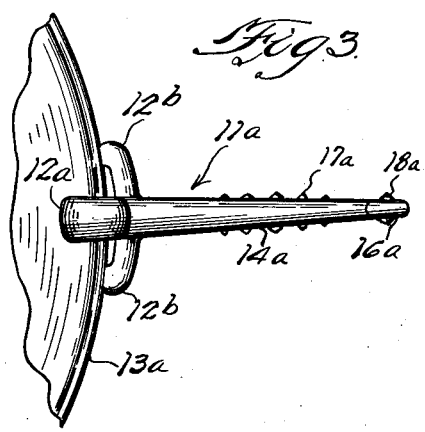
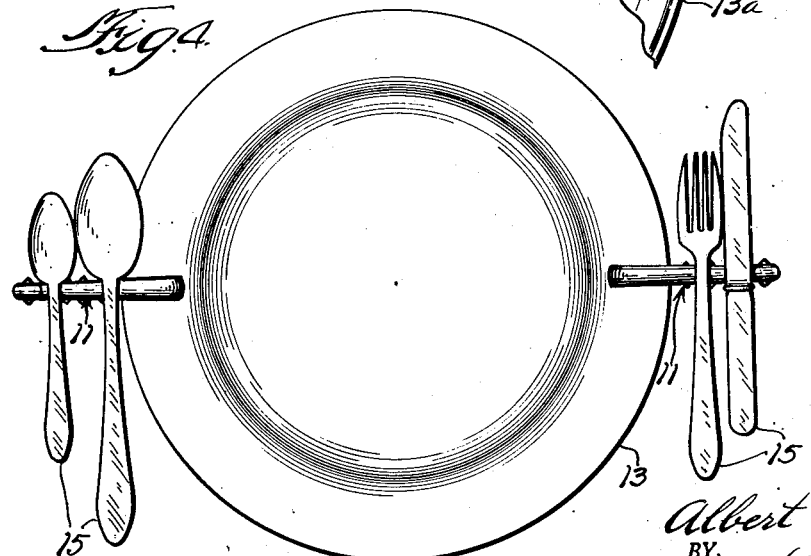
INVENTOR.
Albert M. Gray.
BY
Thiess, Olson & Mecklenburger
Attys.

Patented Oct. 28, 1952

2,615,318

UNITED STATES PATENT OFFICE 2,615,318

SUPPORT FOR EATING UTENSILS

Albert M. Gray, Chicago, Ill.

Application June 7, 1949, Serial No. 97,605

1 Claim. (Cl. 65—65)

This invention relates to a device for supporting eating utensils when not in use, and it is an object of the invention to provide an improved device of this character.

It is the prevailing practice to rest eating utensils on the edge of a plate or other dish when they are momentarily out of use. This frequently causes the handles of the utensils to become sticky as a result of their contact with food on the plate. It frequently happens also that the utensils fall from their precarious position on the edge of the plate and soil the tablecloth or become unsanitary by virtue of contact with a table covering of questionable cleanliness, such as is found frequently in public eating places.

According to a preferred embodiment of this invention, a utensil supporting device is connected and preferably detachably connected to the edge of a plate or other dish, this device having a surface or edge adapted to support eating utensils securely and sanitarily adjacent the edge of the dish. The device when detachable is preferably bifurcated at one end for convenient and secure attachment to the edge of the dish, and has an elongated portion extending radially and substantially horizontally outward of the dish, the outer end being curved upward or having an upward extending protrusion thereon. Eating utensils may be laid on the horizontal portion and are protected against falling to the table by the upwardly extending portion at the outer end of the device.

It will be immediately apparent that a device of this character will support eating utensils securely in an orderly and convenient position. The utensils when supported by this device will also inherently lie along lines substantially tangential to the circumference of the dish in accordance with good etiquette, this device having the additional advantage thereby of eliminating the common tendency to rest utensils on a plate in such position that they extend radially outward of the plate, contrary to better etiquette.

Accordingly, it is another object of this invention to provide a support for eating utensils which securely supports the food contacting portion of an eating utensil above the level of the table or other eating surface.

It is another object of the invention to provide a support for eating utensils which may be securely but detachably connected to a plate or other dish.

It is another object of this invention to provide a support for eating utensils which substantially eliminates the possibility of accidental contact of such utensils with a table covering.

It is another object of this invention to provide a support for eating utensils which securely supports eating utensils in substantially tangential relationship to the circumference of a plate or other dish.

It is another object of this invention to provide a device for supporting eating utensils, said device having a bifurcated portion for detachable connection to a plate or other dish and having an elongated portion with a surface or edge adapted to support eating utensils.

The invention, together with further objects and advantages thereof, will best be understood by reference to the following description taken in connection with the accompanying drawing, and its scope will be pointed out in the appended claim.

In the drawing, in which like parts are indicated by like reference numerals:

Fig. 1 is an elevational view of a supporting device illustrating a preferred embodiment of the invention, a portion of a dinner plate in connection therewith being shown in cross section;

Fig. 2 is an elevational view of a similar device illustrating another embodiment of the invention, a portion of a cereal bowl in connection therewith being shown in cross section;

Fig. 3 is a plan view of the same device illustrated in Fig. 2; and

Fig. 4 is a plan view of a table setting including a dinner plate, various eating utensils, and two supporting devices similar to that shown in Fig. 1.

According to the preferred embodiment of this invention, the supporting device 11 has a bifurcated end, the cooperating prongs 12 thereof being adapted to engage the edge of a food container such as a dinner plate 13. An elongated portion or shank 14 of the supporting device extends radially and horizontally outward of the plate 13, the upper edge or surface of the shank 14 serving to support eating utensils 15, as shown in Fig. 4.

At the outer end of the shank 14 is an upwardly extending protrusion 16 to reduce or eliminate the possibility of eating utensils falling off the end of the support.

According to the preferred embodiment, a series of horizontally extending protrusions 17 are arranged on the vertical sides of the shank 14. These protrusions 17 provide a convenient grip in order to facilitate the mounting of the supporting device on the dinner plate 13. The protrusions are also decorative and enhance the appearance of the supporting device. A single bead or horizontal protrusion 18 may also be located on each of the vertical sides near the outer end of the supporting device, these protrusions 18 serving the same purpose as the beads or protrusions 17.

The supporting device is preferably, but not necessarily, made of plastic. Plastic is preferred because it is attractive, easily cleaned, light in weight, resilient, and will not scratch the china or other material of which the inner plate 13 or other dish is made. It is essential that the material used in the construction of the supporting device be fairly resilient in order that the prongs 12 may properly engage the edges of dishes which are of varying thickness and curvature.

The shank portion 14 should be substantially horizontal but may slope slightly without danger of the eating utensils sliding off the supporting device in one direction or the other since the vertical protrusion 16 and the edge of the dinner plate or dish tend to keep the eating utensils in their proper position.

The vertical protrusion 16 may be formed in any desired manner and should be of such dimensions as to practically eliminate the danger of the eating utensil slipping off the end of the shank portion 14.

The embodiment of this invention, illustrated in Figs. 2 and 3, varies from the supporting device shown in Fig. 1 in several respects, all of which are within the purview of this invention. The supporting device 11a is designed for detachable connection to the edge of a cereal bowl. Such bowls are of substantial height and have substantially vertical walls, and accordingly the supporting device 11a illustrated in Figs. 2 and 3 is curved in the manner illustrated such that the utensil supporting shank 14a is maintained in a horizontal position and the curved end or protrusion 16a extends upward when the supporting device 11a is secured to the substantially vertical section of the dish.

Another variation in design, which does not necessarily accompany the application of the supporting device to a vertically inclined dish wall, concerns the structure of the dish-engaging portion of the device. Rather than being bifurcated, the connecting end is arranged to form a hook 12a adapted to engage the edge of the dish. This variation in the design of the device may be particularly desirable when applied to cereal dishes because of the considerable variation in the thickness of such dishes. The supporting device 11a may actually clamp to the dish but may also merely hang on the dish.

A third variation of the supporting device 11a, over the embodiment shown in Figs. 1 and 4, concerns the use of twin dish-engaging members 12b for engaging the outer or lower side of the dish. Where the relatively loose hook 12a is used, the twin members 12b make the supporting device more stable.

The advantages of the eating utensil supporting device shown in the drawing and described above are readily apparent. The device is readily connected to a plate or other dish and after such connection is securely supported thereby while being readily removed when so desired. After attachment to a dish, the upper edge or surface of the shank portion 14 provides a convenient and secure support for eating utensils, the vertical protrusion 18 substantially eliminating the danger of the utensils sliding off the end of the shank.

The supporting devices extend substantially radially outward from the plate with the result that an eating utensil when placed thereon naturally tends to lie along a line substantially tangential to the circumference of the dish, as illustrated in Fig. 4. The utensils are thereby conveniently and attractively located with respect to the dish.

These supporting devices may be of various colors, or of mixed colors, to match the color pattern of the dishes or other table accessories and thereby serve as attractive table accessories in themselves.

The supporting device or devices may, if preferred, be integral with the plate or other dish, or it may be parmanently or detachably connected to the plate or dish. It may also be of any suitable material and may have an infinite number of shapes and sizes.

While particular embodiments of the invention have been shown, it will be understood, of course, that the invention is not limited thereto since many modifications may be made, and it is, therefore, contemplated to cover by the appended claim any such modifications as fall within the true spirit and scope of the invention.

The invention having thus been described, what is claimed and desired to be secured by Letters Patent is:

A support for eating utensils, said support having a bifurcated end for detachable connection to a plate, and an elongated, substantially linear utensil-supporting portion arranged to extend in a substantially horizontal direction when said bifurcated end is detachably connected to a plate and when such plate is in its normal, food-containing position, said support also having an upwardly extending protrusion at the end thereof opposite said bifurcated end, said support having a narrow, resilience-providing slit opening into the closed end of the slot formed by the said bifurcated end and extending in the same general direction as said slot.

ALBERT M. GRAY.

REFERENCES CITED

The following references are of record in the file of this patent:

UNITED STATES PATENTS

| Number | Name | Date |
|---|---|---|
| 178,112 | Byrkit | May 30, 1876 |
| 509,738 | Hommel | Nov. 28, 1893 |
| 927,088 | Wallace | July 6, 1909 |
| 938,187 | Walker | Oct. 26, 1909 |
| 1,321,145 | Price | Nov. 11, 1919 |
| 1,323,924 | Stevens | Dec. 2, 1919 |
| 1,369,945 | Stearns | Mar. 1, 1921 |
| 1,540,394 | Hall et al. | June 2, 1925 |
| 1,577,510 | Wyman | Mar. 23, 1926 |
| 1,987,896 | Ericsson | Jan. 15, 1935 |
| 2,298,901 | Pickering | Oct. 13, 1942 |
| 2,354,968 | Pickering | Aug. 1, 1944 |

FOREIGN PATENTS

| Number | Country | Date |
|---|---|---|
| 2,559 | Great Britain | Feb. 18, 1887 |
| 28,934 | Denmark | May 28, 1910 |
| 271,771 | Great Britain | June 2, 1927 |
| 28,640/30 | Australia | Aug. 25, 1931 |
| 376,484 | Great Britain | July 14, 1932 |
| 380,574 | Great Britain | Sept. 22, 1932 |
| 672,195 | Germany | Feb. 22, 1939 |